(12) United States Patent
Mohadikar (10) Patent No.: US 12,492,671 B2
(45) Date of Patent: Dec. 9, 2025

(54) STAMPED PUMP ACTUATOR AND METHOD OF ASSEMBLING SAME

(71) Applicant: Eaton Intelligent Power Limited, Dublin (IE)

(72) Inventor: Kapil Mohadikar, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/253,724

(22) PCT Filed: Dec. 10, 2021

(86) PCT No.: PCT/EP2021/025489
§ 371 (c)(1),
(2) Date: May 19, 2023

(87) PCT Pub. No.: WO2022/122186
PCT Pub. Date: Jun. 16, 2022

(65) Prior Publication Data
US 2024/0018925 A1   Jan. 18, 2024

(30) Foreign Application Priority Data
Dec. 11, 2020   (IN) .............................. 202011053945

(51) Int. Cl.
*F02M 59/10*   (2006.01)

(52) U.S. Cl.
CPC ... *F02M 59/102* (2013.01); *F02M 2200/8023* (2013.01); *F02M 2200/803* (2013.01); *F02M 2200/8053* (2013.01)

(58) Field of Classification Search
CPC ............... F02M 59/027; F02M 59/102; F02M 2200/803; F02M 2200/8023;
(Continued)

(56) References Cited

U.S. PATENT DOCUMENTS

| | | | |
|---|---|---|---|
| 5,664,530 A | 9/1997 | Ammon | |
| 10,024,202 B2 * | 7/2018 | Corbett | ................ F02M 59/102 |

(Continued)

FOREIGN PATENT DOCUMENTS

| | | |
|---|---|---|
| CN | 101122304 A | 2/2008 |
| CN | 104185720 A | 12/2014 |

(Continued)

OTHER PUBLICATIONS

International Search Report and Written Opinion for International Application No. PCT/EP2021/025489 mailed on Mar. 21, 2022, 10 pages.

*Primary Examiner* — Hai H Huynh
*Assistant Examiner* — Johnny H Hoang
(74) *Attorney, Agent, or Firm* — Baker Botts L.L.P.

(57) ABSTRACT

A pump actuator for use between a cam and a pump includes an outer body, an inner body, an axle and a bearing. The outer body has an outer body inner surface. The inner body is received by the outer body. The inner body has an inner body outer surface. The axle is supported by the inner body. The bearing is supported on the axle. The inner body includes at least one stamped feature protruding outwardly from the inner body outer surface. The at least one stamped feature is configured to form an interference fit with the outer body inner surface.

20 Claims, 8 Drawing Sheets

(58) Field of Classification Search
CPC .... F02M 2200/8053; F01L 1/407; F01L 1/08; F01L 1/46; F16C 13/006; F16C 13/022; F16C 19/26; F16C 19/466; F16C 2360/18; F16C 2360/22; F16H 53/06
See application file for complete search history.

(56) References Cited

U.S. PATENT DOCUMENTS

| | | | |
|---|---|---|---|
| 10,436,164 B2* | 10/2019 | Wang | F04B 1/0439 |
| 11,231,000 B2* | 1/2022 | Geyer | F04B 1/0408 |
| 2012/0063929 A1* | 3/2012 | Tsutsumi | F03D 15/00 417/330 |
| 2014/0039390 A1* | 2/2014 | Holtwick | A61M 5/34 604/110 |
| 2014/0046267 A1* | 2/2014 | Holtwick | A61M 5/2448 604/191 |
| 2014/0066879 A1* | 3/2014 | Holtwick | A61J 1/2093 604/411 |
| 2015/0308437 A1* | 10/2015 | Ning | F04D 19/002 417/423.7 |
| 2017/0299037 A1 | 10/2017 | Abrahamson | |
| 2018/0104994 A1* | 4/2018 | Lin | B60C 23/137 |
| 2020/0199878 A1 | 6/2020 | Clark | |

FOREIGN PATENT DOCUMENTS

| | | |
|---|---|---|
| CN | 105604754 A | 5/2016 |
| CN | 107244200 A | 10/2017 |
| CN | 107345491 A | 11/2017 |
| CN | 107859541 A | 3/2018 |
| WO | WO 8300724 A1 | 3/1983 |

\* cited by examiner

STAMPED PUMP ACTUATOR AND METHOD OF ASSEMBLING SAME

CROSS-REFERENCE TO RELATED APPLICATIONS

This application claims the benefit of Indian Provisional App. No. 202011053945, filed on Dec. 11, 2020. The disclosure of the above application is incorporated herein by reference.

FIELD

The present disclosure relates generally to a pump actuator or roller tappet and more particularly to a pump actuator having a stamped inner body where the inner body is assembled with the outer body using a press fit operation.

BACKGROUND

A pump actuator is an integral component of a spark ignition direct injection (SIDI) fuel system. The pump actuator redirects the fuel pump cam rotary motion into linear fuel pump drive motion. The pump actuator is a roller follower that is sandwiched between a cam and a gasoline direct injection (GDI) pump. During operation, the pump actuator will pressurize fuel inside the GDI pump so as to maintain pressure inside the fuel rail. Typical direct injection fuel pressure can be 90 times higher than conventional fuel pressures. It is desirable to increase load carrying capacity and reduce friction of the pump actuator. Furthermore, it is desirable to reduce cost with alternate geometry, materials and manufacturing processes. Current production pump actuator bodies include single piece cold formed structures.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A pump actuator for use between a cam and a pump includes an outer body, an inner body, an axle and a bearing. The outer body has an outer body inner surface. The inner body is received by the outer body. The inner body has an inner body outer surface. The axle is supported by the inner body. The bearing is supported on the axle. The inner body includes at least one stamped feature protruding outwardly from the inner body outer surface. The at least one stamped feature is configured to form an interference fit with the outer body inner surface.

According to additional features, the at least one stamped feature comprises at least one wedge-shaped geometry having a ramp surface thereon. In other examples, the at least one stamped feature comprises at least one trapezoidal-shaped geometry having a ramp surface thereon. In other examples, the at least one stamped feature comprises at least one dimple-shaped geometry having a ramp surface thereon.

In other features, the at least one stamped feature comprises a plurality of stamped features formed around the inner body. The plurality of stamped features and the outer body inner surface undergo localized elastic deformation. The inner body and the outer bodies are press-fit together. The inner body further includes an angled support web. In examples, the plurality of stamped features comprises (i) a first pair of stamped features having first and second opposing stamped features; and (ii) a second pair of stamped features having third and fourth opposing stamped features.

A pump actuator for use between a cam and a pump and constructed in accordance to another example includes an outer body, an inner body, an axle and a bearing. The outer body has an outer body inner surface. The inner body is received by the outer body. The inner body has an inner body outer surface. The bearing is supported on the axle. The inner body includes opposing stamped features protruding outwardly from the inner body outer surface. The opposing stamped features are configured to form an interference fit with the outer body inner surface.

In other features, the opposing stamped features include a first and a second pair of stamped features. The first pair of stamped features comprises first and second opposing stamped features. The second pair of stamped features comprises third and fourth opposing stamped features. In one arrangement, each of the stamped features comprises at least one wedge-shaped geometry having a ramp surface thereon. In other examples, each of the stamped features comprises at least one trapezoidal-shaped geometry having a ramp surface thereon. In other examples, each of the stamped features comprises at least one dimple-shaped geometry having a ramp surface thereon.

A method of assembling a pump actuator for use between a cam and a pump includes, providing an outer body, providing an inner body, deflecting portions of the inner body outwardly and slidably advancing one of the outer body and inner body relative to the other of the outer body and the inner body. The outer body has an outer body inner surface. The inner body has an inner body outer surface. The portions of the inner body deflected outwardly creates a plurality of stamped features that extend outwardly from the inner body outer surface. The stamped features slidably negotiate along the outer body inner surface creating an interference fit between the outer body and the inner body.

In additional features, deflecting portions of the inner body comprises creating one of wedge-shaped, trapezoidal-shaped and dimple-shaped geometries having ramp surfaces thereon. The ramp surfaces slidably advance along the outer body inner surface during the slidable advancing. The inner and outer bodies are simultaneously aligned relative to each other during the slidable advancement. In one example, the outer body is located around the upper surface of the inner body. The outer body is advanced downwardly such that a bottom surface of the outer body rides over the ramped surfaces. In another example, the outer body is located around an upper surface of the inner body. The inner body is advanced upwardly such that a bottom surface of the outer body rides over the ramped surfaces.

BRIEF DESCRIPTION OF THE DRAWINGS

The present disclosure will become more fully understood from the detailed description and the accompanying drawings, wherein.

DETAILED DESCRIPTION

Figure 1:
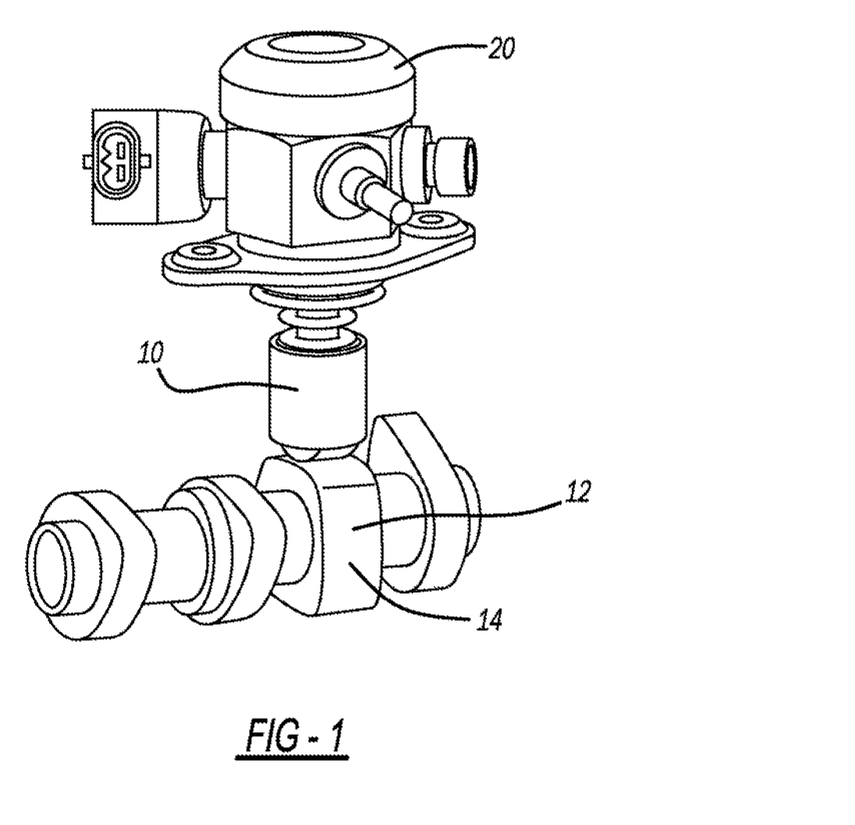
FIG. 1 is a front perspective view of a pump actuator arranged between a cam on a camshaft and a high pressure GDI pump according to one example of the present disclosure.

With initial reference to FIG. 1, a pump actuator or roller tappet constructed in accordance to one example of the present disclosure is shown and generally identified at reference numeral 10. The pump actuator 10 is shown in operative engagement with a cam 12 on a camshaft 14. Translation of the pump actuator 10 pressurizes fuel inside a GDI pump 20. The pump actuator 10 uses rotatable motion of the camshaft 14 and into linear fuel pump drive motion.

Turning now to FIGS. 2A-3C, a pump actuator constructed in accordance to one example of the present disclosure is shown and generally identified at reference 110. As will become appreciated by the following discussion, the pump actuator 110 is a two-piece pump actuator having a body assembly 122 including an outer body or sleeve 130 and an inner body or cup 132. The outer body 130 functions as a guide in the engine bore. The inner body 132 supports the functional load path (bearing support through pump pad contact point). The inner body 132 further includes an angled support web 150 that increases strength and stiffness.

According to the present disclosure, the inner body 132 can include stamped features 134 that can protrude outwardly beyond an outer diameter or surface 136 of the inner body 132. The stamped features 134 can include two pairs of opposing stamped features 134 including first and second opposing stamped features and third and fourth opposing stamped features. The opposing relationships of the stamped features 134 can influence a robust interference fit when assembled to the outer body 130. The stamped features 134 can be punched from the inside of the inner body 132 to create the outwardly extending protrusions. The inner body 132 is inserted relative to the outer body 130 causing the stamped features 134 to form an interference or press-fit during assembly (as will be described herein with respect to FIGS. 6A-6C) with an inner diameter or surface 138 of the outer body 130. The stamped features 134 can attain a wedge-shaped geometry presenting a ramp surface 140 due to the stamping. In this regard, the ramp surface 140 of the wedge-shaped features 134 will help in a smooth and gradual assembly of the inner and outer bodies 132, 130.

Figure 6A:
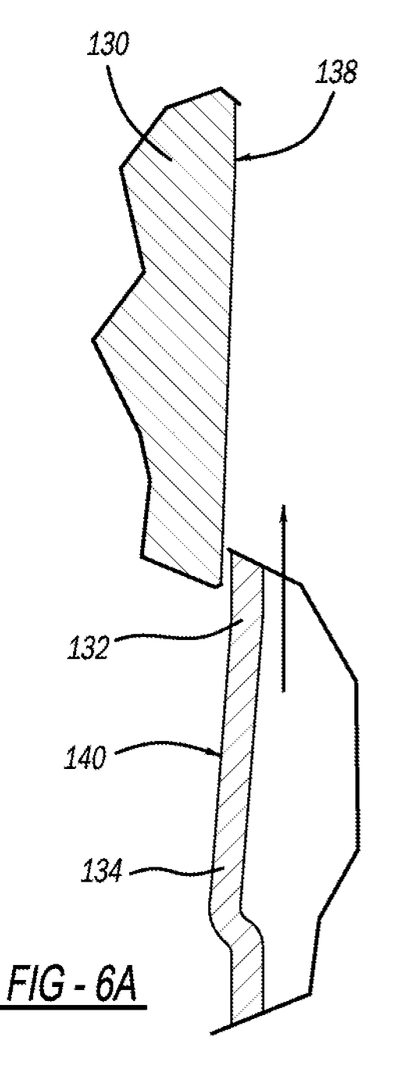
FIGS. 6A-6C are sequence views of the inner body of FIG. 3A being slidably advanced into the outer body whereby a press-fit is attained between the inner body and the outer body at the wedge-shaped protrusions.
Figure 6B:
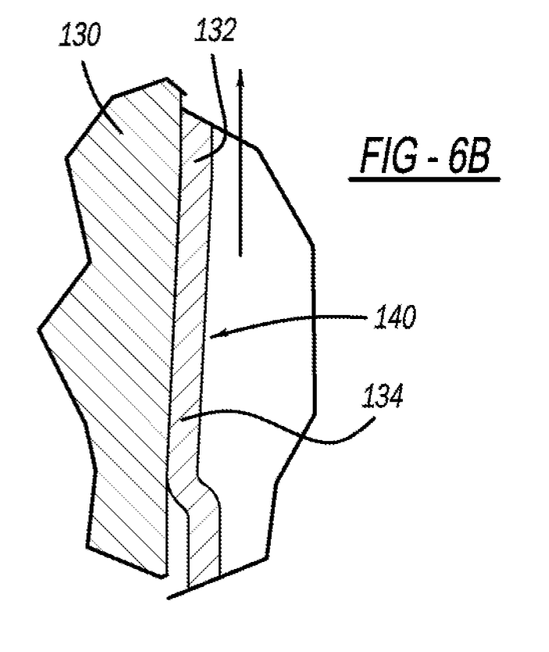
Figure 6C:
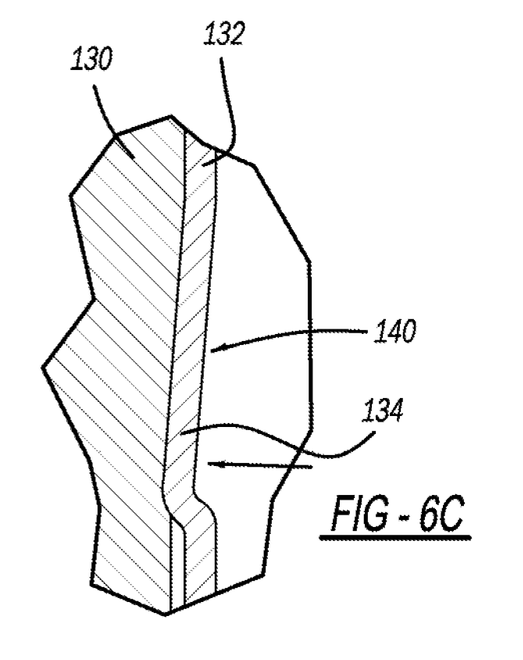

With further reference to FIGS. 6A-6C, an exemplary method of assembling the inner and outer bodies 132, 130 will be described. In one example, the outer body 130 can be located around an upper surface 146 of the inner body 132. The inner body 132 can be advanced generally upwardly (from a position generally shown in FIG. 6A to a position generally shown in FIG. 6B and finally to a position shown in FIG. 6C). During advancement of the inner body 132 upward, the ramped surface 140 of the stamped feature 134 initially negotiates across a bottom surface 148 of the outer body 130. It is appreciated that, due to the interference or press-fit, the outer body 130 and/or the inner body 132 may slightly deform to accommodate the stamped features 134. It will be further appreciated that while the above discussion has been described with the inner body 132 being advanced upwardly into the outer body 130, the outer body 130 may be advanced downwardly relative to the inner body 132. In other arrangements both of the inner and outer bodies 132, 130 may be concurrently advanced toward each other.

The wedge-shaped surface 140 and the inner surface 138 of the outer body 130 will undergo localized elastic deformation. Frictional force between the surfaces will inhibit the outer and inner bodies 130, 132 from disengaging during operation. In additional advantages, the wedge shaped features 134 assists in alignment of the outer and inner bodies 130, 132 during simultaneous assembly. Alignment of the inner and outer bodies 130, 132 can be done in a single operation. In this regard, additional welding or other assembly operations are not needed. A cost reduction can be realized by avoiding such additional assembly steps.

Figure 2A:
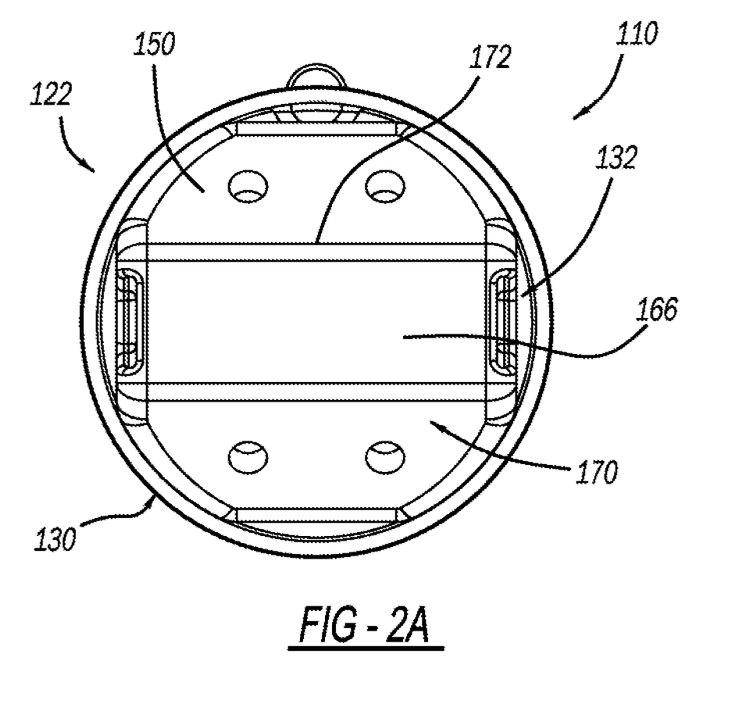
FIG. 2A is a top view of a pump actuator constructed in accordance to one example of the present disclosure.
Figure 2B:
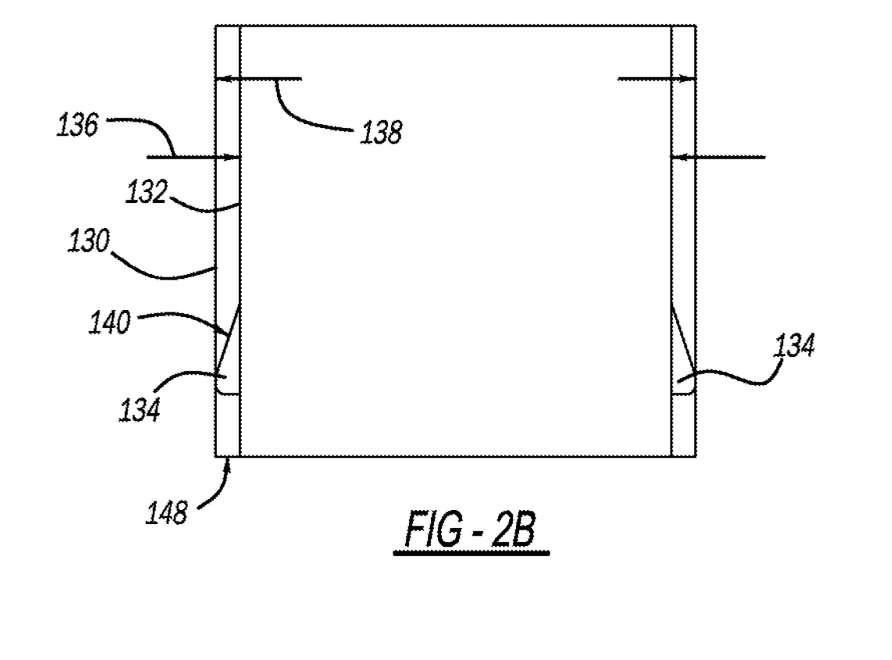
FIG. 2B is a sectional view of the pump actuator of FIG. 2A illustrating wedge shaped protrusions on the inner body.
Figure 3A:
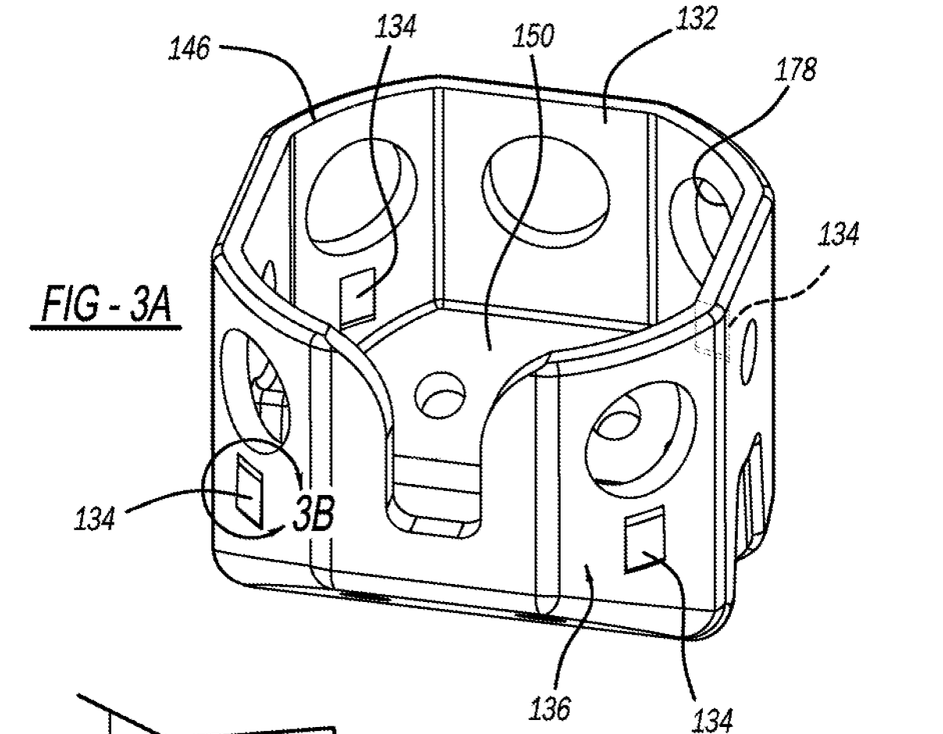
FIG. 3A is a first perspective view of the inner body of the pump actuator of FIG. 2A.
Figure 3B:
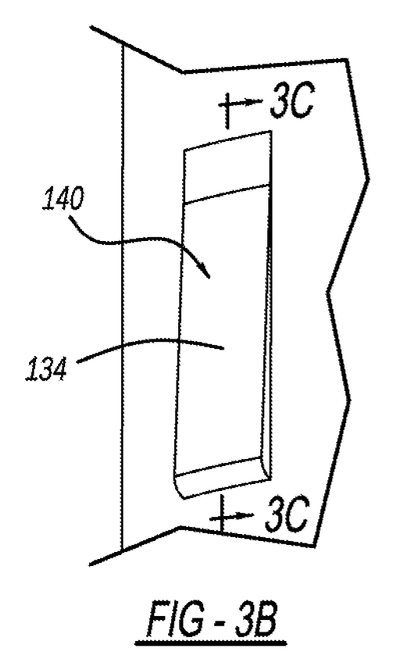
FIG. 3B is a detail view of a wedge-shaped protrusion of the inner body of FIG. 3A.
Figure 3C:
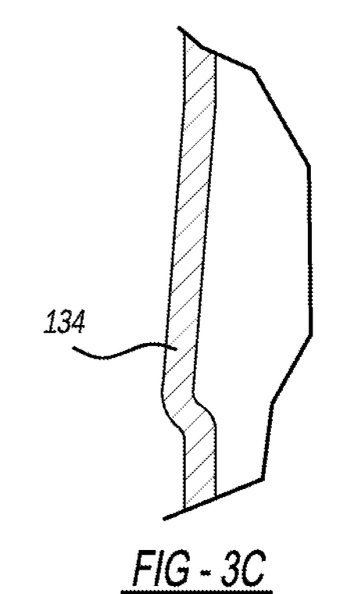
FIG. 3C is a sectional view of the wedge-shaped protrusion of FIG. 3B taken along lines 3C-3C.

The pump actuator 110 can further include an axle 166 and a bearing 170. In one non-limiting example, the bearing 170 can generally include an outer roller 172 and a plurality of internal rollers (not specifically shown). A plurality of apertures 178 are shown around the inner body 132.

Turning now to FIGS. 4A-4C and FIGS. 7A-7C, an inner body 232 constructed in accordance with additional examples of the present disclosure will be described. Unless otherwise described herein, like features are denoted with like reference numerals as the inner body 132 and increased by 100. The inner body 232 can include stamped features 234 that can protrude outwardly beyond an outer diameter or surface 236 of the inner body 232. The stamped features 234 can include two pairs of opposing stamped features 234 including first and second opposing stamped features and third and fourth opposing stamped features. The opposing relationships of the stamped features 234 can influence a robust interference fit when assembled to the outer body 130.

Figure 4A:
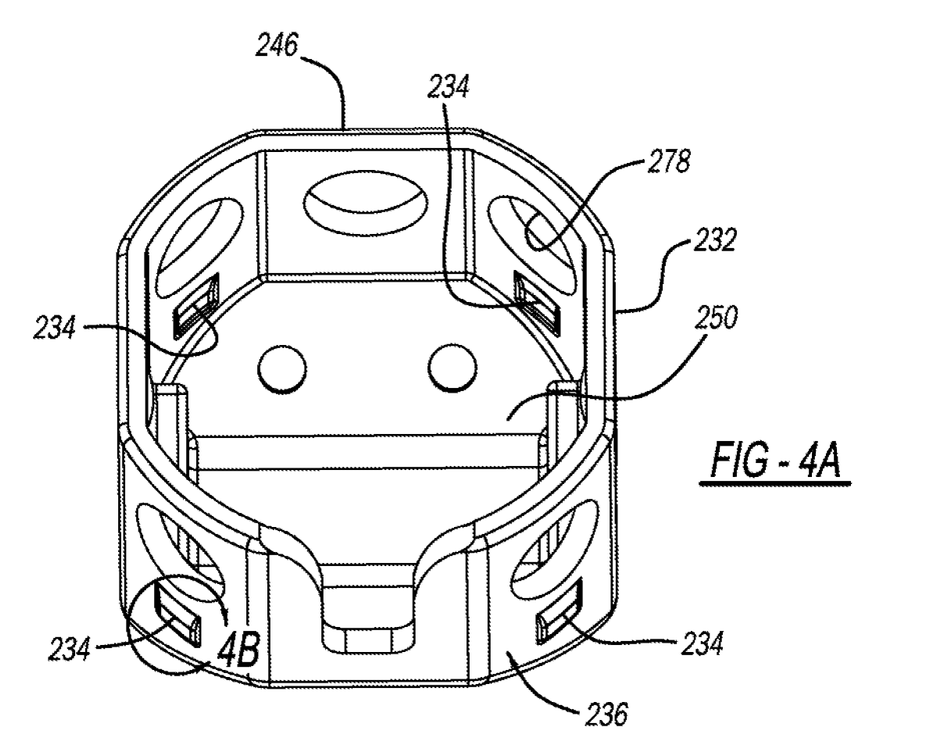
FIG. 4A is a first perspective view of an inner body of a pump actuator, the inner body comprising trapezoidal-shaped protrusions constructed in accordance to additional features of the present disclosure.
Figure 4B:
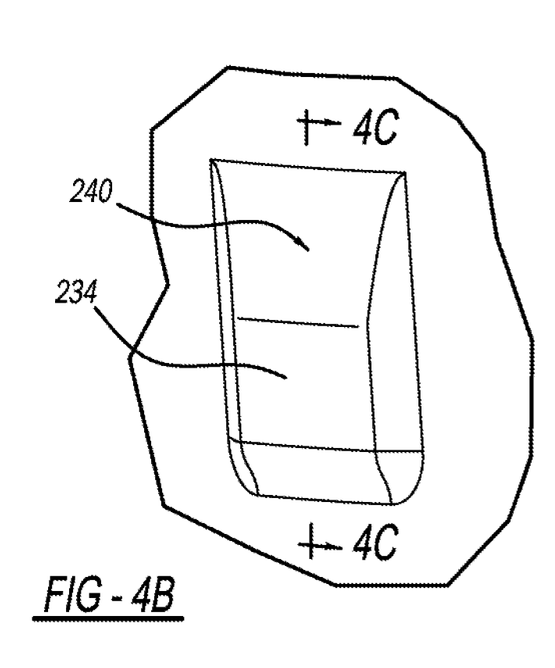
FIG. 4B is a detail view of a trapezoidal-shaped protrusion of the inner body of FIG. 4A.
Figure 4C:
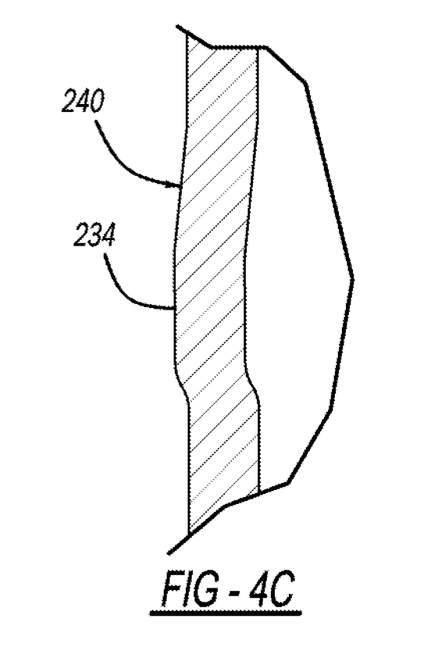
FIG. 4C is a sectional view of the trapezoidal-shaped protrusion of FIG. 4B taken along lines 4C-4C.

In the example shown in FIGS. 4A-4C the stamped features are in the form of trapezoidal-shaped protrusions. The stamped features 234 can be punched from the inside of the inner body 232 to create the outwardly extending protrusions. The inner body 232 is inserted relative to the outer body 130 causing the stamped features 234 to form an interference or press-fit during assembly (as will be described herein with respect to FIGS. 7A-7C) with an inner diameter or surface 138 of the outer body 130. The stamped features 234 can attain a trapezoidal-shaped geometry presenting a ramp surface 240 due to the stamping. In this regard, the ramp surface 240 of the trapezoidal-shaped features 234 will help in a smooth and gradual assembly of the inner and outer bodies 232, 130.

Figure 7A:
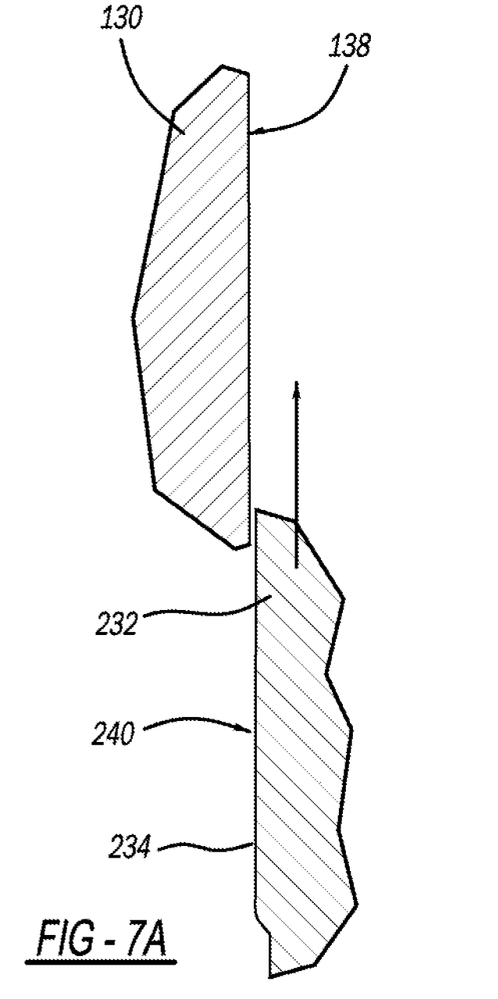
FIGS. 7A-7C are sequence views of the inner body of FIG. 4A being slidably advanced into the outer body whereby a press-fit is attained between the inner body and the outer body at the trapezoidal-shaped protrusions.
Figure 7B:
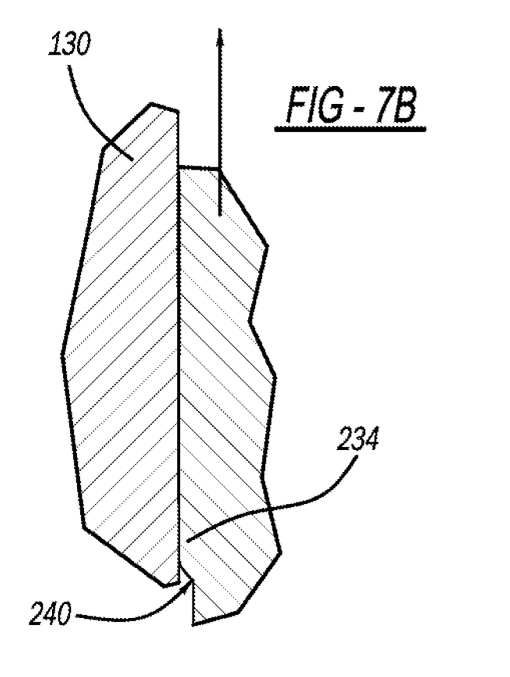
Figure 7C:
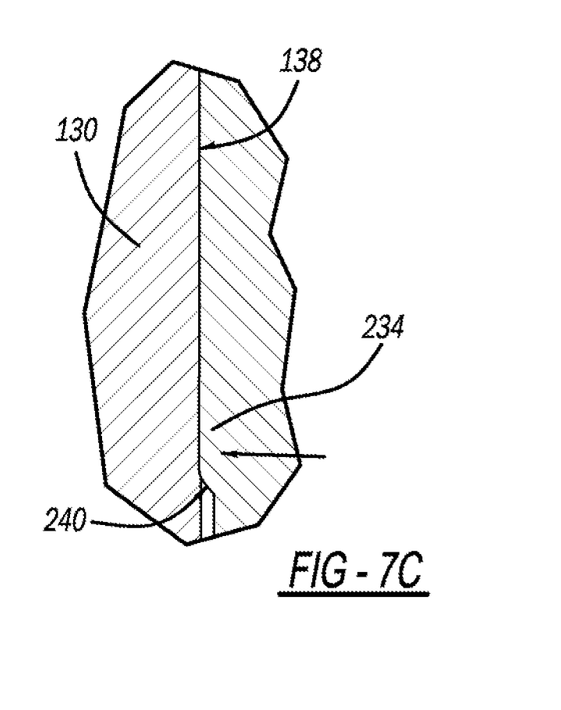

With further reference to FIGS. 7A-7C, an exemplary method of assembling the inner and outer bodies 232, 130 will be described. In one example, the outer body 130 can be located around an upper surface 246 of the inner body 232. The inner body 232 can be advanced generally upwardly (from a position generally shown in FIG. 7A to a position generally shown in FIG. 7B and finally to a position shown in FIG. 7C). During advancement of the inner body 232 upward, the ramped surface 240 of the stamped feature 234 initially negotiates across a bottom surface 148 of the outer body 130. It is appreciated that, due to the interference or press-fit, the outer body 130 and/or the inner body 232 may slightly deform to accommodate the stamped features 234. It will be further appreciated that while the above discussion has been described with the inner body 232 being advanced upwardly into the outer body 130, the outer body 130 may be advanced downwardly relative to the inner body 232. In other arrangements, both of the inner and outer bodies 232, 130 may be concurrently advanced toward each other.

The trapezoidal-shaped surface 240 and the inner surface 138 of the outer body 130 will undergo localized elastic deformation. Frictional force between the surfaces will inhibit the outer and inner bodies 230, 132 from disengaging during operation. In additional advantages, the trapezoidal-shaped features 234 assists in alignment of the outer and inner bodies 130, 232 during simultaneous assembly. Alignment of the inner and outer bodies 130, 232 can be done in a single operation. In this regard, additional welding or other assembly operations are not needed. A cost reduction can be realized by avoiding such additional assembly steps.

Turning now to FIGS. 5A-5C and FIGS. 8A-8C, an inner body 332 constructed in accordance to additional examples of the present disclosure will be described. Unless otherwise described herein, like features are denoted with like reference numerals as the inner body 132 and increased by 200. The inner body 332 can include stamped features 334 that can protrude outwardly beyond an outer diameter or surface 336 of the inner body 332. The stamped features 334 can include two pairs of opposing stamped features 334 including first and second opposing stamped features and third and fourth opposing stamped features. The opposing relationships of the stamped features 334 can influence a robust interference fit when assembled to the outer body 130.

Figure 5A:
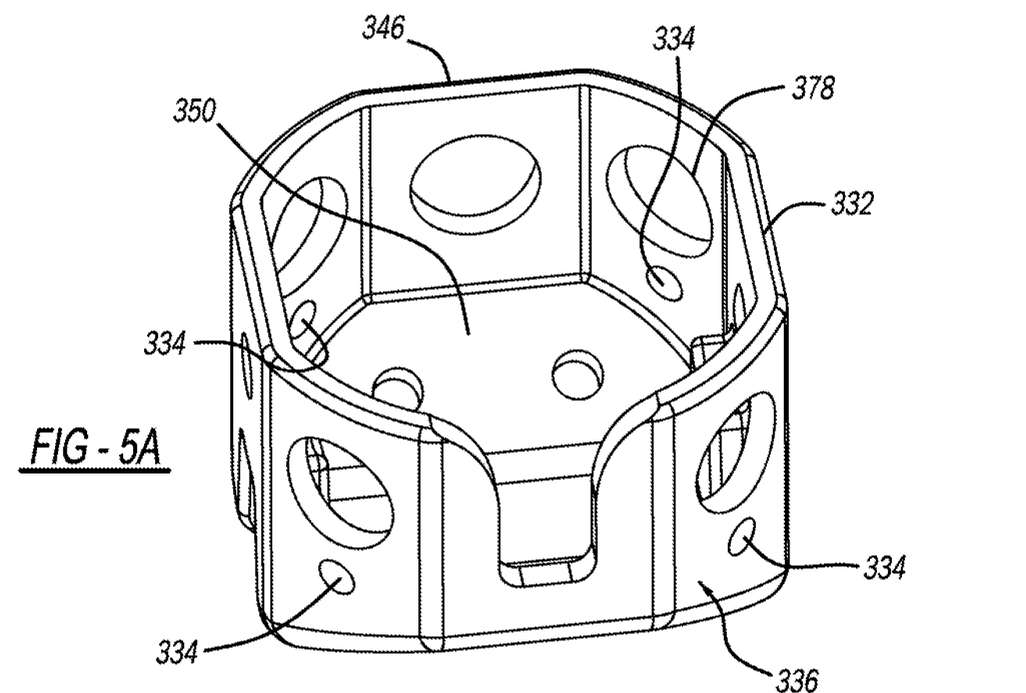
FIG. 5A is a first perspective view of an inner body of a pump actuator, the inner body comprising dimple-shaped protrusions constructed in accordance with additional features of the present disclosure.
Figure 5B:
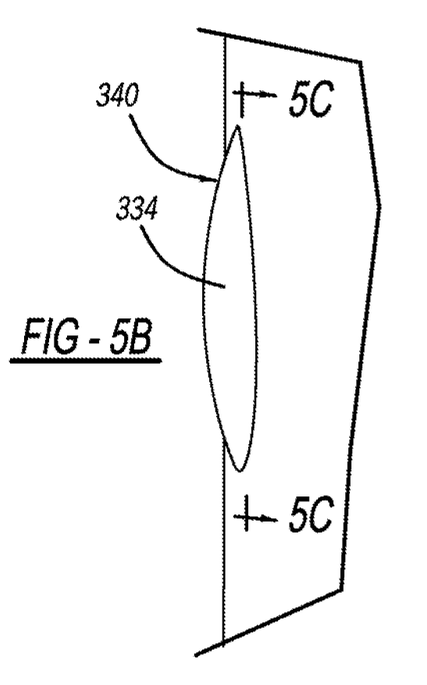
FIG. 5B is a detail view of a dimple-shaped protrusion of the inner body of FIG.
Figure 5C:
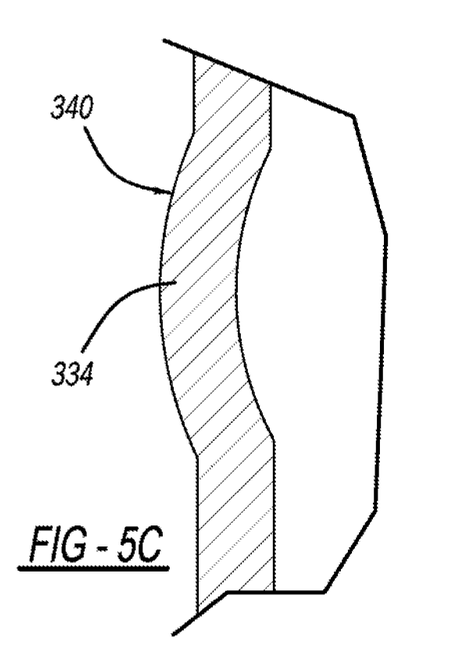
FIG. 5C is a sectional view of the dimple-shaped protrusion of FIG. 5B taken along lines 5C-5C.

In the example shown in FIGS. 5A-5C the stamped features are in the form of spherical-shaped or dimple-shaped protrusions. The stamped features 334 can be punched from the inside of the inner body 332 to create the outwardly extending protrusions. The inner body 332 is inserted relative to the outer body 130 causing the stamped features 334 to form an interference or press-fit during assembly (as will be described herein with respect to FIGS. 8A-8C) with an inner diameter or surface 138 of the outer body 130. The stamped features 334 can attain a dimple-shaped geometry presenting a ramp surface 340 due to the stamping. In this regard, the ramp surface 340 of the dimple-shaped features 334 will help in a smooth and gradual assembly of the inner and outer bodies 332, 130.

Figure 8A:
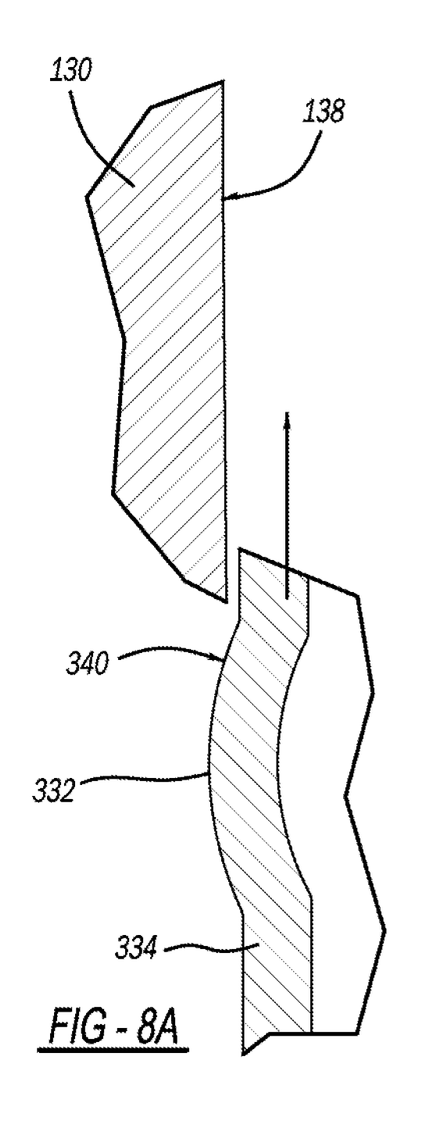
FIGS. 8A-8C are sequence views of the inner body of FIG. 5A being slidably advanced into the outer body whereby a press-fit is attained between the inner body and the outer body at the dimple-shaped protrusions.
Figure 8B:
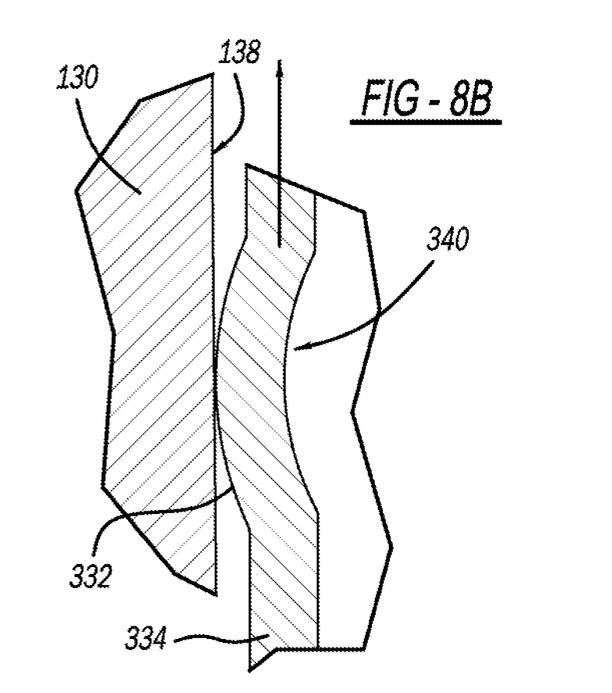
Figure 8C:
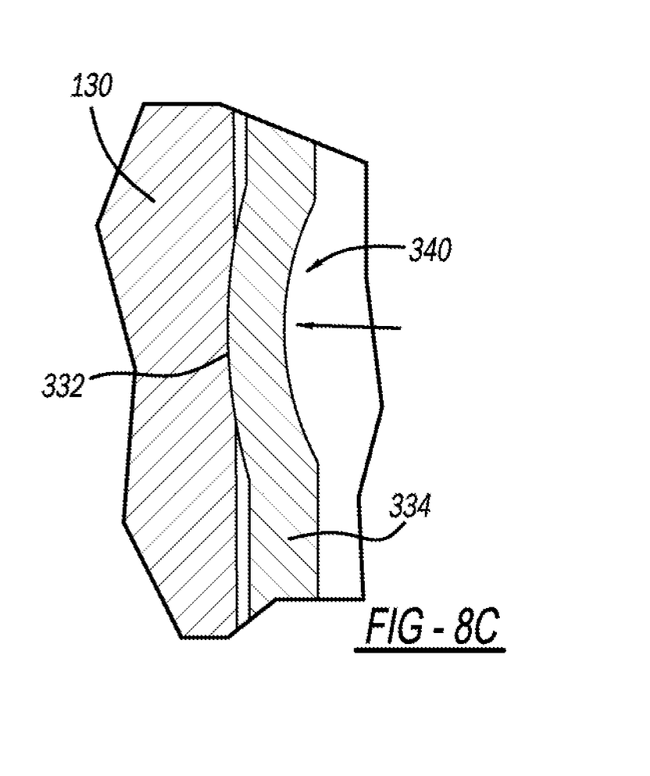

With further reference to FIGS. 8A-8C, an exemplary method of assembling the inner and outer bodies 332, 130 will be described. In one example, the outer body 130 can be located around an upper surface 346 of the inner body 332. The inner body 332 can be advanced generally upwardly (from a position generally shown in FIG. 8A to a position generally shown in FIG. 8B and finally to a position shown in FIG. 8C). During advancement of the inner body 332 upward, the ramped surface 340 of the stamped feature 334 initially negotiates across a bottom surface 148 of the outer body 130. It is appreciated that, due to the interference or press-fit, the outer body 130 and/or the inner body 332 may slightly deform to accommodate the stamped features 334. It will be further appreciated that while the above discussion has been described with the inner body 332 being advanced upwardly into the outer body 130, the outer body 130 may be advanced downwardly relative to the inner body 332. In other arrangements, both of the inner and outer bodies 332, 130 may be concurrently advanced toward each other.

The dimple-shaped surface 340 and the inner surface 138 of the outer body 130 will undergo localized elastic deformation. Frictional force between the surfaces will inhibit the outer and inner bodies 330, 132 from disengaging during operation. In additional advantages, the dimple-shaped features 134 assists in alignment of the outer and inner bodies 130, 332 during simultaneous assembly. Alignment of the inner and outer bodies 130, 332 can be done in a single operation. In this regard, additional welding or other assembly operations are not needed. A cost reduction can be realized by avoiding such additional assembly steps.

By attaining an interference fit between the outer surface 136, 236, 336 of the inner body 132, 232, 332 and the inner surface 138 of the outer body 130, the inner and outer bodies of the pump actuator can be fixedly coupled together without any alternative and/or supplemental fixing components and/or methods. The stamped solution provides a more cost effective and easier to manufacture pump actuator assembly compared to available prior art offerings. By way of comparison, some prior art examples require welding the inner and outer bodies together. In production, laser welding requires capital investment and additional cycle time. Moreover, before welding the inner and outer bodies need to be aligned perfectly to avoid any bearing perpendicularity issues. The press-fit solution described herein enables assembling the two bodies during a concurrent alignment operation thereby avoiding laser welding costs.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A pump actuator for use between a cam and a pump, the pump actuator comprising:
   an outer body having an outer body inner surface;
   an inner body received by the outer body, the inner body having an inner body outer surface;
   an axle supported by the inner body; and
   a bearing supported on the axle;
   wherein the inner body of the pump actuator includes a plurality of stamped features configured to simultaneously (1) form an interference fit between outer and inner bodies of the pump actuator and (2) align the outer and inner bodies of the pump actuator with respect to each other, wherein the plurality of stamped features protrudes outwardly from the inner body outer surface.

2. The pump actuator of claim 1 wherein at least one stamped feature comprises at least one wedge-shaped geometry having a ramp surface thereon.

3. The pump actuator of claim 1 wherein at least one stamped feature comprises at least one trapezoidal-shaped geometry having a ramp surface thereon.

4. The pump actuator of claim 1 wherein at least one stamped feature comprises at least one dimple-shaped geometry having a ramp surface thereon.

5. The pump actuator of claim 1 wherein the plurality of stamped features are formed around the inner body.

6. The pump actuator of claim 5 wherein the plurality of stamped features and the outer body inner surface undergo localized elastic deformation.

7. The pump actuator of claim 1 wherein the inner body and the outer body are press-fit together.

8. The pump actuator of claim 1 wherein the inner body further includes an angled support web.

9. The pump actuator of claim 1 wherein the plurality of stamped features comprises:
   a first pair of stamped features having first and second opposing stamped features; and
   a second pair of stamped features having third and fourth opposing stamped features.

10. A pump actuator for use between a cam and a pump, the pump actuator comprising:
    an outer body having an outer body inner surface;
    an inner body received by the outer body, the inner body having an inner body outer surface;
    an axle supported by the inner body; and
    a bearing supported on the axle;
    wherein the inner body of the pump actuator includes a plurality of opposing stamped features configured to simultaneously (1) form an interference fit between outer and inner bodies of the pump actuator and (2) align the outer and inner bodies of the pump actuator with respect to each other, wherein the plurality of opposing stamped features protrudes outwardly from the inner body outer surface.

11. The pump actuator of claim 10 wherein the plurality of opposing stamped features comprises:
    a first pair of stamped features having first and second opposing stamped features; and
    a second pair of stamped features having third and fourth opposing stamped features.

12. The pump actuator of claim 11 wherein each of the plurality of opposing stamped features comprises a wedge-shaped geometry having a ramp surface thereon.

13. The pump actuator of claim 11 wherein each of the plurality of opposing stamped features comprises a trapezoidal-shaped geometry having a ramp surface thereon.

14. The pump actuator of claim 11 wherein each of the plurality of opposing stamped features comprises a dimple-shaped geometry having a ramp surface thereon.

15. The pump actuator of claim 10 wherein the inner body and the outer body are press-fit together.

16. A method of assembling a pump actuator for use between a cam and a pump, the method comprising:
    providing an outer body having an outer body inner surface;
    providing an inner body having an inner body outer surface;
    deflecting portions of the inner body outwardly creating a plurality of stamped features, the plurality of stamped features configured to simultaneously (1) form an interference fit between outer and inner bodies of the pump actuator and (2) align the outer and inner bodies of the pump actuator with respect to each other, wherein the plurality of stamped features protrudes outwardly from the inner body outer surface; and
    slidably advancing one of the outer body and inner body relative to other of the outer body and inner body such that the plurality of stamped features slidably negotiate along the outer body inner surface creating the interference fit between the outer body and the inner body.

17. The method of claim 16 wherein deflecting portions of the inner body further comprises:
    creating one of wedge-shaped, trapezoidal-shaped, and dimple-shaped geometries having ramp surfaces thereon, wherein the ramp surfaces slidably advance along the outer body inner surface during the slidably advancing.

18. The method of claim 17 wherein the slidably advancing further comprises simultaneously aligning the outer and inner bodies relative to each other.

19. The method of claim 17 wherein the slidably advancing further comprises:
    locating the outer body around an upper surface of the inner body; and
    advancing the outer body downwardly such that a bottom surface of the outer body rides over the ramp surfaces.

20. The method of claim 17 wherein the slidably advancing further comprises:
    locating the outer body around an upper surface of the inner body; and
    advancing the inner body upwardly such that a bottom surface of the outer body rides over the ramp surfaces.

* * * * *